W. R. CHANDLER.
STRAIGHT AIR BRAKE ATTACHMENT FOR AUTOMATIC SYSTEMS.
APPLICATION FILED JAN. 18, 1910.
962,696.
Patented June 28, 1910.
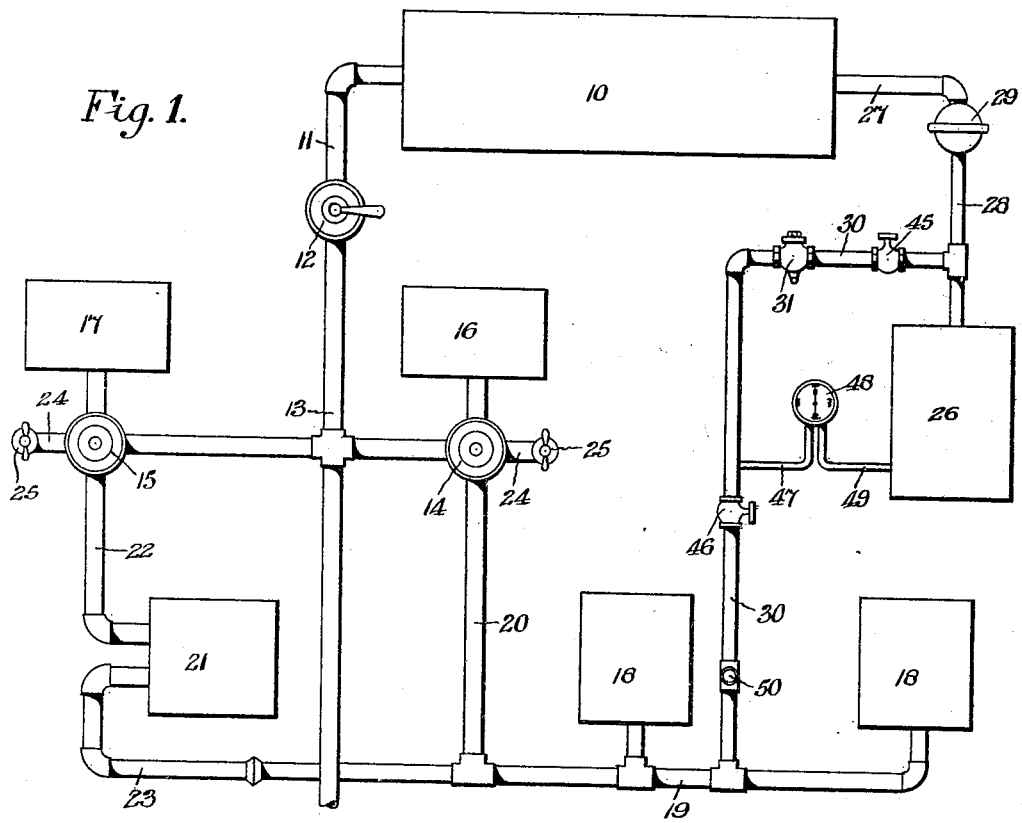
Fig. 1.
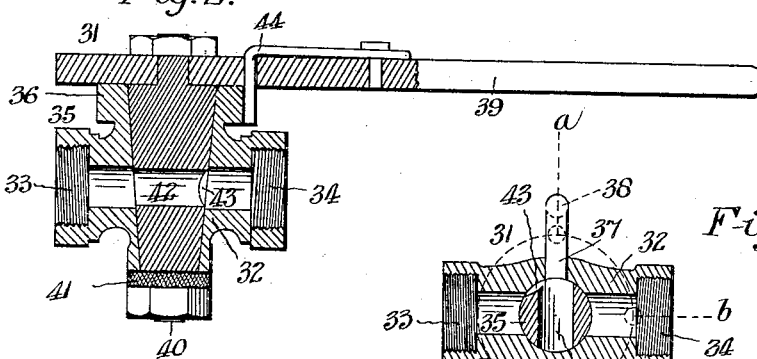
Fig. 2.
Fig. 3.
Witnesses
F. A. Barron.
A. R. Walton.
Willard R. Chandler,
Inventor
By
Attorney

UNITED STATES PATENT OFFICE.

WILLARD R. CHANDLER, OF BRANCHVILLE, SOUTH CAROLINA.

STRAIGHT-AIR-BRAKE ATTACHMENT FOR AUTOMATIC SYSTEMS.

962,696.  Specification of Letters Patent.  Patented June 28, 1910.

Application filed January 18, 1910. Serial No. 538,680.

*To all whom it may concern:*

Be it known that I, WILLARD R. CHANDLER, citizen of the United States, residing at Branchville, in the county of Orangeburg and State of South Carolina, have invented certain new and useful Improvements in Straight-Air-Brake Attachments for Automatic Systems, of which the following is a specification.

My invention relates to a straight air attachment for automatic brake systems, my object being to provide a straight air system which will be simple and cheap and absolutely efficient in its practical operation, and which may be readily and easily installed in connection with an automatic air system by any engineer or other skilled mechanic.

The broad object which is accomplished by this invention is well known, that is, the independent control, by straight air, of the engine and tender of a train, but beyond this my invention should not be confounded with those combined automatic and straight air brakes, for instance, the Westinghouse "E—T" equipment, which, in their installation, require that the ordinary automatic system be taken out and an entire new system substituted. The installation of my straight air attachment requires only the necessary fittings and six or eight hours' work to connect the same without changing the automatic system at all.

With this in mind, my invention resides in the features of construction, arrangement and operation which I will now describe with reference to the accompanying drawing, in which—

Figure 1 is a diagrammatic view, illustrating certain parts of an automatic brake system to which my improved attachment is connected; Fig. 2 is a central vertical section through the straight air valve; and Fig. 3 is a horizontal section through the same.

According to Fig. 1, the automatic system comprises a main reservoir, 10, main reservoir pipe, 11, engineer's brake valve, 12, train pipe, 13, driver and tender triple valves, 14 and 15, respectively, driver and tender auxiliary reservoirs, 16 and 17, respectively, driver brake cylinders, 18 and pipes, 19 and 20, and tender brake cylinder, 21, and pipe, 22.

According to my invention, I provide a straight air pipe, 23, leading into the oil hole of the tender brake cylinder, 21, from brake cylinder connection, 19, and I close the exhaust ports of the driver and tender triple valves, 14 and 15, by pipes, 24, having retaining valves, 25, whereby to retain the air in the brake cylinders, 18 and 21, when the automatic system is released. I further provide a straight air reservoir, 26, supplied from the main reservoir, 10, through pipes, 27 and 28, at the junction of which is a reducing valve, 29. The straight air pipe, 30, leads from the pipe, 28, between reducing valve, 29, and straight air reservoir, 26, or it may lead directly from said reservoir to the brake cylinder connection, 19, and in this pipe, 30, is located the straight air valve, 31, the preferred form of which, though it may be of many varied forms, I have shown in Figs. 2 and 3, this form being extremely simple and insuring quick release of the air.

The valve, 31, comprises a casing, 32, having longitudinal passages, 33 and 34, communicating with its conical bore which is transversely located and receives the conical plug, 35. The casing, 32, has also an upper circular disk, 36, and a short exhaust pipe, 37, extending transversely through one side thereof from its bore at right angles to the axes of passages, 33 and 34, which pipe has a turned-down extremity, 38 (see Fig. 3). The plug, 35, has an upper operating arm, 39, resting upon valve disk, 36, and a lower stem, 40, by which it is locked through the casing, 32, by nuts, 41, and has also a transverse bore, 42, and a short tangential cut-out portion, 43, in its surface extending in the same plane with its bore, 42, and communicating with one end thereof whereby to form the exhaust port, as shown in Fig. 3. The operating handle or arm, 39, carries a spring member, 44, to engage cut-out portions in the peripheral edge of the valve disk, 36, in the three positions of said arm which are indicated by dotted lines in Fig. 3, and numbered *a*, *b* and *c*, position *a* being the exhausting position, position *b* being the opening position, and position *c* being the lapped or closed position.

In addition to the foregoing, I provide a cut-off valve, 45, in the straight air pipe, 30, between reservoir, 26, and straight air valve, 31, and a similar cut-off valve, 46, in said pipe between said valve, 31, and the brake cylinder connection, 19, and between brake cylinder connection, 19, and a pipe, 47, leading to a double gage, 48, to which also leads a pipe, 49, from the straight air reservoir, 26.

My straight air attachment has especial advantages in its inexpensiveness and simplicity of structure and simplicity of operation and the fact that the air, held in the brake cylinders by the retaining cocks, 25, when the automatic system is released, may be instantaneously released through the straight air valve, 31. The automatic system may be disregarded entirely, for instance, when switching, and the straight air attachment used altogether, with a great saving in air and consequently in fuel. I can clean out the straight air valve or renew any displaced piping, by cutting off valve 45, and I can cut out my attachment altogether by cutting off valve 46 and opening up the retaining valves 25, permitting use of the automatic system as if there were no attachment, and furthermore an automatic system provided with my attachment has all the advantages of the very much more complicated and very much more expensive combination systems hereinbefore referred to. I may also add a safety valve, 50, in the straight air pipe, 30, between cut-off, 46, and the brake cylinder connection, 19, in order to prevent an over-load of air upon the brake cylinders which might injure the rigging.

I claim:

1. An attachment, for automatic brake systems having a main reservoir, train pipe, auxiliary reservoir, triple valve, brake cylinder, brake cylinder connection comprising a cut-off for the exhaust of the triple valve, a straight air reservoir connected to the main reservoir, a straight air pipe leading from said straight air reservoir and communicating with the brake cylinder and a straight air valve having ports to register its reservoir with the brake cylinder and other ports to control the air held in the brake cylinder by said triple valve cut-off.

2. An attachment, for automatic brake systems having a main reservoir, train pipe, auxiliary reservoir, triple valve, brake cylinder, brake cylinder connection comprising a cut-off for the exhaust of the triple valve, a straight air reservoir having connections to the main reservoir, a reducing valve in said connections, a straight air pipe leading from said straight air reservoir to the brake cylinder connection, a straight air valve having ports to register its reservoir with the brake cylinder connection, and other ports to control the air held in the cylinder by the triple valve cut-off, and cut-off valves in the straight air pipe upon each side of the straight air valve for the purpose specified.

3. An attachment, for automatic brake systems having a main reservoir, train pipe, auxiliary reservoir, triple valve, brake cylinder, brake cylinder connection comprising a pipe connected to the exhaust of the triple valve and having a retaining valve to hold the air in the brake cylinder, a straight air reservoir connected to the main reservoir, a straight air pipe leading from said straight air reservoir to the brake cylinder connection, a straight air valve in said straight air pipe having ports to register its reservoir with the brake cylinder connection and other ports to control the air held in the brake cylinder by said retaining valve, and a cut-off valve in the straight air pipe between said straight air valve and the brake cylinder connection whereby the attachment may be altogether cut out and the automatic system permitted to normally operate by opening the retaining valve.

In testimony whereof I affix my signature in presence of two witnesses.

WILLARD R. CHANDLER.

Witnesses:
A. R. WALTON,
F. A. BARRON.